(12) United States Patent
Cairns

(10) Patent No.: US 11,021,050 B2
(45) Date of Patent: Jun. 1, 2021

(54) KINETIC ENERGY RECOVERY BOOSTING SYSTEM UTILISING HYDRAULIC BRAKING

(71) Applicant: VN-AC IP LTD, London (GB)

(72) Inventor: Alasdair Cairns, London (GB)

(73) Assignee: VN-AC IP LTD, London (GB)

( * ) Notice: Subject to any disclaimer, the term of this patent is extended or adjusted under 35 U.S.C. 154(b) by 0 days.

(21) Appl. No.: 16/465,262

(22) PCT Filed: Nov. 30, 2017

(86) PCT No.: PCT/EP2017/080922
§ 371 (c)(1),
(2) Date: May 30, 2019

(87) PCT Pub. No.: WO2018/100034
PCT Pub. Date: Jun. 7, 2018

(65) Prior Publication Data
US 2019/0389297 A1      Dec. 26, 2019

(30) Foreign Application Priority Data

Nov. 30, 2016   (GB) ...................................... 1620314

(51) Int. Cl.
*B60K 6/12*     (2006.01)
*F02B 37/10*    (2006.01)
(Continued)

(52) U.S. Cl.
CPC ................ *B60K 6/12* (2013.01); *F02B 37/10* (2013.01); *F02D 41/0007* (2013.01);
(Continued)

(58) Field of Classification Search
CPC . B60K 6/12; F02B 37/10; F02B 37/14; F15B 1/02; F15B 2201/315;
(Continued)

(56) References Cited

U.S. PATENT DOCUMENTS 4,201,049 A * 5/1980 Tobber .................... F02C 1/002
                                                         417/92
6,840,229 B1 * 1/2005 Djordjevic ............ F16D 27/004
                                                         123/497
(Continued)

FOREIGN PATENT DOCUMENTS

EP       1990533 A1 * 11/2008 ......... F02D 41/3863
EP       1990533 A1   11/2008
(Continued)

*Primary Examiner* — Jesse S Bogue
*Assistant Examiner* — Loren C Edwards
(74) *Attorney, Agent, or Firm* — Ryan, Mason & Lewis, LLP

(57) ABSTRACT

The invention provides a vehicle engine system comprising: a fuel pump for selectively delivering fuel under high pressure; an accumulator having a first chamber for receiving an output from the fuel pump and a second chamber for receiving an oil feed, wherein as one chamber is filled up the other chamber is compressed; wherein on vehicle acceleration the fuel pump delivers fuel to a common rail fuel injection system, and on vehicle braking the fuel pump delivers fuel to the first chamber of the accumulator to thereby put the oil in the second chamber under pressure, and wherein on subsequent acceleration the oil chamber delivers an output under pressure.

20 Claims, 9 Drawing Sheets

(51) Int. Cl.
    *F02D 41/00*       (2006.01)
    *F02D 41/10*       (2006.01)
    *F02D 41/38*       (2006.01)
    *F02M 55/02*      (2006.01)
    *F02M 59/44*      (2006.01)

(52) U.S. Cl.
    CPC ....... *F02D 41/107* (2013.01); *F02D 41/3845* (2013.01); *F02M 55/025* (2013.01); *F02M 59/447* (2013.01); *F02D 2200/501* (2013.01)

(58) Field of Classification Search
    CPC .... F02D 41/0007; F02D 41/107; F02D 41/12; F02D 41/38; F02D 41/3845; F02D 2200/501; F02M 55/025; F02M 59/447; Y02E 60/15; Y02E 60/17; Y02T 10/6208; Y02T 10/6282
    See application file for complete search history.

(56) References Cited

U.S. PATENT DOCUMENTS

2012/0180481 A1\*   7/2012   Kapich ................... F02B 37/10
                                                       60/606
2012/0198843 A1    8/2012   Sun et al.

FOREIGN PATENT DOCUMENTS

| JP | 3487046 B2 | 1/2004 | |
|---|---|---|---|
| JP | 2009138671 A | 6/2009 | |
| WO | WO-2016063266 A2 * | 4/2016 | ............. F02B 37/00 |
| WO | PCT/EP2017/080922 | 3/2018 | |

\* cited by examiner

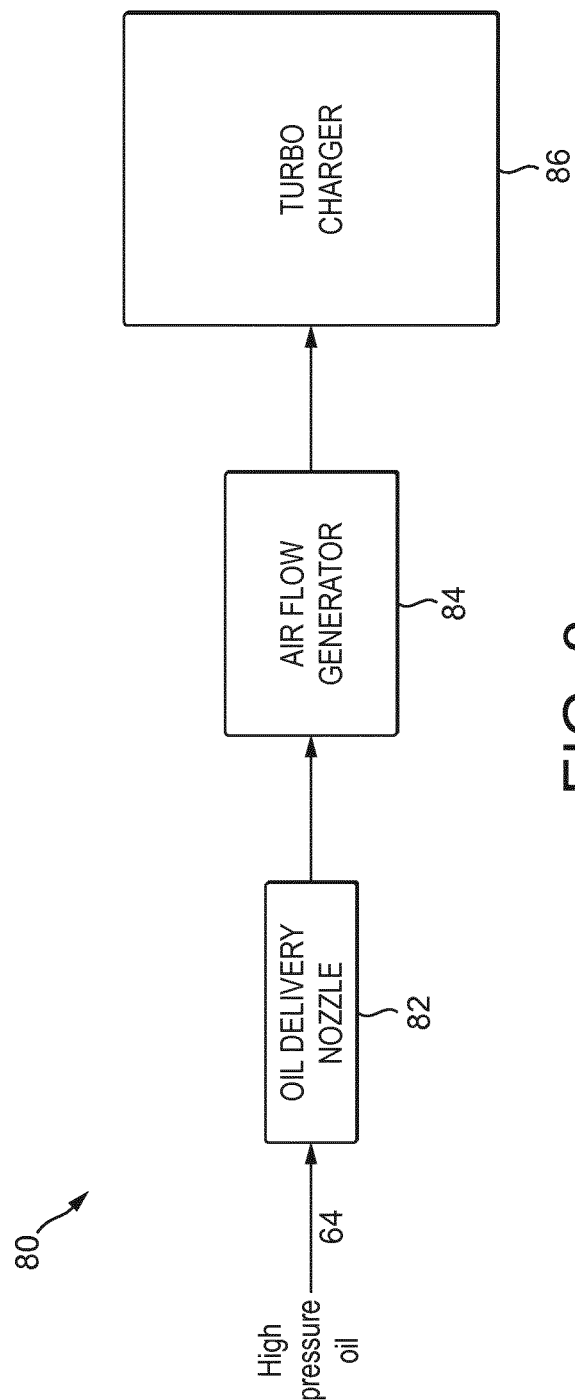

KINETIC ENERGY RECOVERY BOOSTING SYSTEM UTILISING HYDRAULIC BRAKING

BACKGROUND TO THE INVENTION

Field of the Invention

The present invention relates to the capture of energy using hydraulics during braking of a vehicle, and then using that captured energy in an operation subsequent to the braking operation. The captured energy may be used in a turbocharger during acceleration.

Description of the Related Art

It is known in the art to provide a system in which kinetic energy is captured during braking of a vehicle. In a subsequent operation, such as acceleration, the captured energy is used in order to assist the engine of the vehicle.

Use of a hydraulic system is more cost-effective than use of an electrical system, and has the potential to recover a larger proportion of braking energy due to higher power density.

It is known to use turbochargers in engines. One known characteristics of turbochargers is that a delay may be caused on acceleration due to a lag in delivering air to the turbocharger during acceleration.

It is an aim of the present invention to provide for a kinetic energy recovery boost system, which utilises a hydraulic approach, and in which the lag of the turbocharger associated with the delivery of air is minimised.

SUMMARY OF THE INVENTION

In accordance with the invention, a turbocharger in the engine is "spun up" as quickly as possible with a mechanical mechanism. The braking system is used to capture kinetic energy, and then the captured energy is used to "spin up" the turbocharger quickly, and consequently provide an air flow in the turbocharger quickly.

A fuel pump operates under high pressure. It is connected to receive an engine fuel supply as an input and to supply a common rail fuel injection as an output.

A two-way (or multi-stage) accumulator is provided. The fuel pump is configured to supply an input to a first side (or first chamber) of a two-way accumulator. A switch is provided at the output of the fuel pump to control the delivery of the high pressure fuel from the fuel pump to the common rail fuel injection or the two-way accumulator.

The second side (or second chamber) of the two-way accumulator is connected to receive an oil feed as an input, and to supply a turbocharger as an output.

The two-way accumulator has one chamber for storing fuel received from the fuel pump, and one chamber for storing oil received from the oil feed. There is compression of a trapped gas between the two chambers such that as one chamber 'fill up' the other chamber is put under pressure. When the chamber under pressure is released, it produces an output under pressure.

In operation, during acceleration the fuel pump supplies the common rail fuel injection. During braking, the fuel pump supplies the two-way accumulator. Thus the fuel chamber of the two-way accumulator is filled by fuel when braking, and this compresses the chamber in which the trapped gas is held. The fuel is delivered by the fuel pump during braking only during the period when the fuel pump is operational, i.e. during the period when the clutch is engaged.

After a braking operation, the two way accumulator is thus presented in a state where the accumulator trapped gas is compressed and held under higher pressure as a result of the fuel filling the fuel chamber. In turn this elevates the pressure on the oil side of the accumulator.

On acceleration, the oil in the oil chamber is released to the turbocharger. As this is held under pressure, when it is released it is released with a discharge of pressure and effectively injected to the turbocharger. During acceleration therefore the oil is provided to the turbocharger more quickly, by using the energy captured during the braking operation from the fuel pump. This delivery of oil is used to deliver an air flow in the turbocharger.

According to the invention there is provided a vehicle engine system comprising: a fuel pump for selectively delivering fuel under high pressure; an accumulator having a first chamber for receiving an output from the fuel pump and a second chamber for receiving an oil feed, wherein as one chamber is filled up the other chamber is compressed; wherein on vehicle acceleration the fuel pump delivers fuel to a common rail fuel injection system, and on vehicle braking the fuel pump delivers fuel to the first chamber of the accumulator to thereby put the oil in the second chamber under pressure, and wherein on subsequent acceleration the oil chamber delivers an output under pressure.

The vehicle engine may further comprise a turbocharger, wherein the oil chamber delivers the output under pressure to the turbocharger. The vehicle engine system may further comprise a rotational element, the rotational element being rotated by the delivered oil output to create an air flow for the turbocharger. The vehicle engine may further comprise a nozzle mechanism for delivering the oil to rotate rotors of the rotational element. The accumulator may have a compression chamber between the first and second chambers.

The vehicle engine may further comprise a mechanism for selectively routing a fuel supply to the common rail fuel injection system or the accumulator. The vehicle engine may further comprise a mechanism for selectively routing the fuel supply, when routed to the accumulator, to the first chamber of the accumulator or a fuel tank.

The vehicle engine may further comprise an oil supply connected to deliver oil to the second chamber of the accumulator.

The invention also provides a method controlling a vehicle engine, comprising: delivering fuel from the fuel pump to a fuel chamber connected to an oil chamber during braking, to thereby put the oil chamber under pressure; and delivering the compressed oil under pressure to a turbocharger during acceleration.

The oil may be delivered to a turbocharger to create an air flow in the turbocharger.

The fuel chamber and oil chamber may be chambers of an accumulator, connected by a compression chamber, wherein as the fuel chamber fills up with fuel the compression chamber puts the oil in the oil chamber under pressure.

The fuel may be delivered to the fuel chamber during a vehicle braking operation. The oil may be released from the oil chamber after a vehicle braking operation. The fuel may be delivered whilst a clutch is engaged. The oil may be released whilst a clutch is engaged.

Preferably the described technique is applied while the clutch is engaged; during braking or during deceleration, or when the accelerator is not engaged.

BRIEF DESCRIPTION OF THE FIGURES

The invention is now described further with reference to the following figures, in which:

FIG. 3 illustrates exemplary elements associated with a turbocharger;

DESCRIPTION OF PREFERRED EMBODIMENTS

The invention is described by way of reference to capturing energy in a vehicle during a braking process, and then using that captured energy in the vehicle in a subsequent acceleration process. One skilled in the art will appreciate that the invention is not limited to the use of the captured energy in a subsequent acceleration process, and the captured energy may be utilised in any operation after the energy has been captured during braking.

Figure 1:
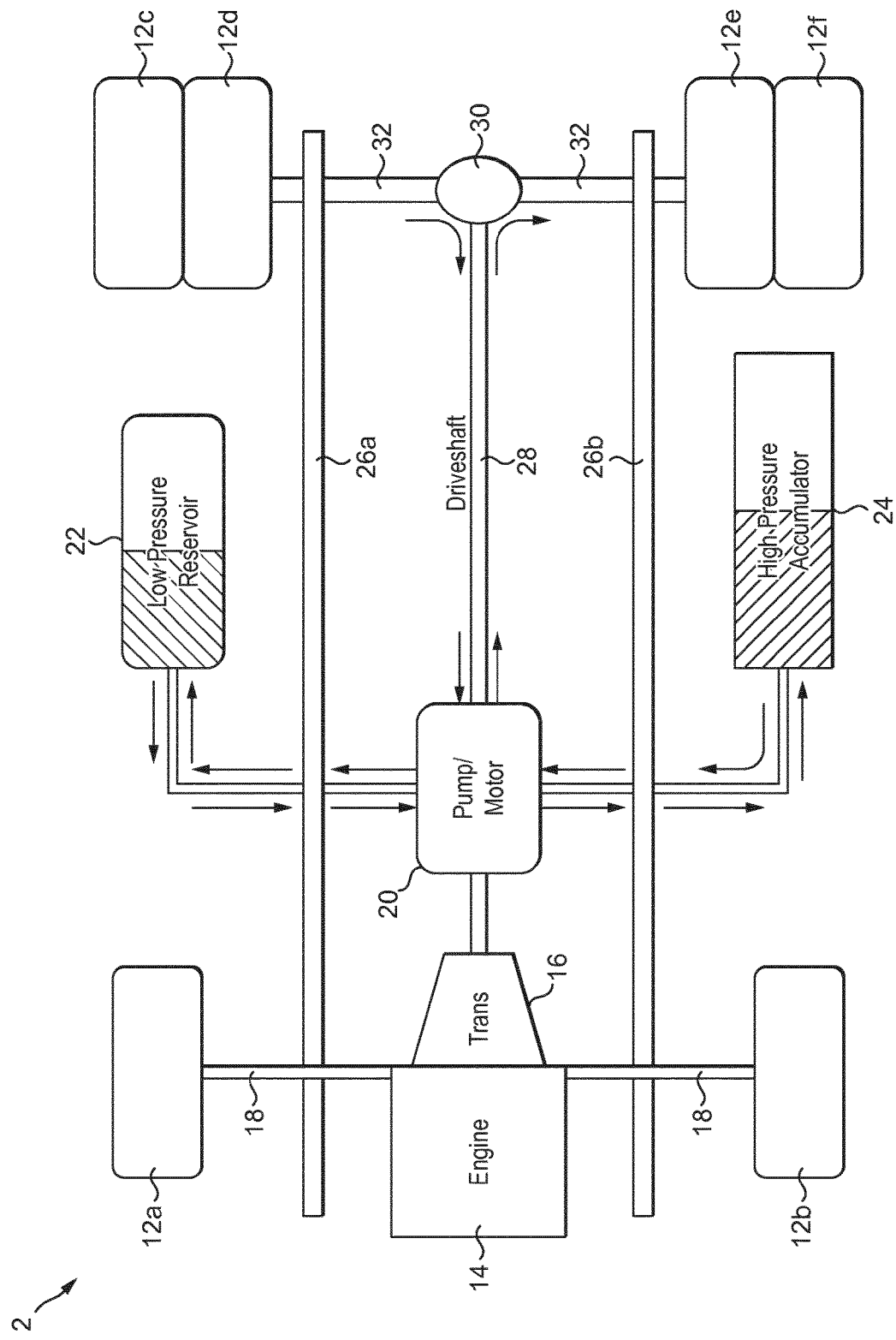
FIG. 1 illustrates a general overview of an exemplary hydraulic hybrid system for a vehicle.

With reference to FIG. 1, there is generally illustrated as denoted by reference numeral 2 elements of a vehicle including elements of a preferred system as described. The exemplary vehicle made reference to in this description is a truck, but the described system may be used in conjunction with any vehicle.

The wheelbase of an exemplary truck is shown in FIG. 1, comprising a pair of front wheels 12a, 12b, and four rear wheels 12c, 12d, 12e, 12f. As shown in FIG. 1 the front wheels 12a, 12b are joined by an axle 18, and the rear wheels 12c, 12d, 12e, 12f are joined by an axle 32. Elements 26a, 26b are shown, and these may simply be mechanical rods which generally support the structure as shown in FIG. 1.

As shown in FIG. 1 the vehicle includes an engine 14 and an associated transmission 16. A transmission 16 is connected to a driveshaft 28, which is connected to a joint 30 to drive the axle 32.

Also shown in FIG. 1 is a low pressure reservoir 22, a pump/motor 20, and a high pressure accumulator 24. As will be described further hereinbelow, the pump/motor provides an input to the low pressure reservoir 22, and receives an output from a low pressure reservoir 22. The pump/motor 20 also provides an input to the high pressure accumulator 24, and receives an output from the high pressure accumulator 24. The pump/motor 20 receives energy from the turn of the axle 32 through the driveshaft 28, and delivers energy through the driveshaft 28 to the axle 32.

The low pressure reservoir may preferably be provided specifically for the described operation, or may be used for other purposes too.

With reference to FIG. 2, an operation in accordance with a preferred arrangement is described in more detail. FIG. 2 shows five parts: FIG. 2a, FIG. 2b, FIG. 2c, FIG. 2d, and FIG. 2e.

Figure 2A:
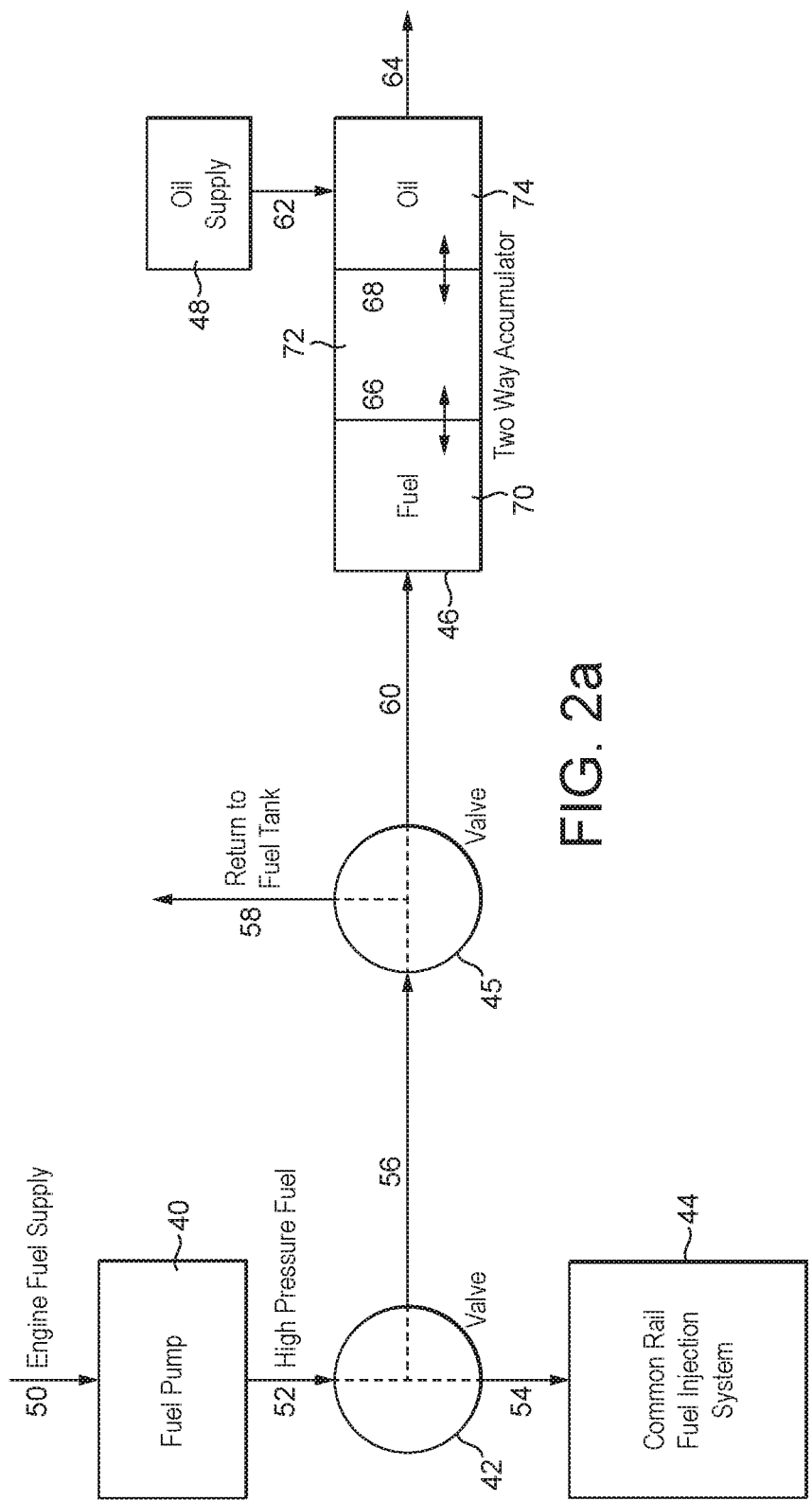
FIGS. 2(a) to 2(e) illustrate the exemplary principle of energy capture during braking and energy delivery during acceleration.

With reference to FIG. 2a there is illustrated the components necessary for understanding the system, which comprise a fuel pump 40, a common rail fuel injection system 44, a valve (or switch) 42, a valve (or switch) 45, a two-way accumulator 46, and an oil supply 48.

The valves (or switches) 42 and 45 may be provided as part of the pump/motor of FIG. 1.

The fuel pump 40 receives an engine fuel supply on connection 50, and generates high pressure fuel on line 52 to the valve 42.

The valve 42 has two outputs, one output providing a connection on line 54 to the common rail fuel injection system, and another output providing a connection on line 56 to the valve 45.

In addition to the input on line 56, the valve 45 generates a first output on line 58 which is a return to a fuel tank, and a further output on line 60 to the two-way accumulator 46.

In addition to receiving an input from the valve 45 on line 60, the two-way accumulator also receives an input on line 62 from the oil supply 48. The two-way accumulator generates an output on line 64, which as will be discussed below is a supply of oil under high pressure.

The two-way accumulator 46 comprises three main portions or chambers, being a chamber 70 which holds fuel, a chamber 74 which holds oil, and a chamber 72 which provides isolation between the two portions 70 and 74, and also allows either portion 70 or 74 to be filled up with fuel or oil respectively, and is compressed to put the other chamber which is not filled up under further pressure. The chamber 72 is generally a compression chamber, and in practice may be a sealed gas chamber or a mechanical spring.

As noted in FIG. 2a, the two-way accumulator has a line 66 separating the fuel chamber 70 from the compression chamber 72, and a line 68 separating the oil chamber 74 from the compression chamber 72. The lines 66 and 68 may both be considered movable, as denoted by the bidirectional arrows, such that the fuel chamber 70 can increase or decrease in size, and the oil chamber 74 can increase or decrease in size. Similarly the compression chamber 72 may increase or decrease in size.

The further operation of the two-way accumulator, and the way in which it is used in order to put either fuel or oil accumulated in the chambers 70 or 74 under pressure, will be described below. The fuel for the fuel chamber 70 is provided on line 60, and the oil for the oil chamber 74 is provided on line 62. Fuel is input on line 60, and oil is output on line 64.

The oil supply 48 may be a tank of oil supplied specifically for this purpose, and separate to oil for any other engine purpose.

The dash lines in the valve 42 indicate that the high pressure fuel input on line 52 may be connected either to the output line 54 or the output line 56. The dash lines in the valve 45 indicate that the output from the valve 42 on line 56 may be provided to the line 58 or provided to the line 60.

Figure 2B:
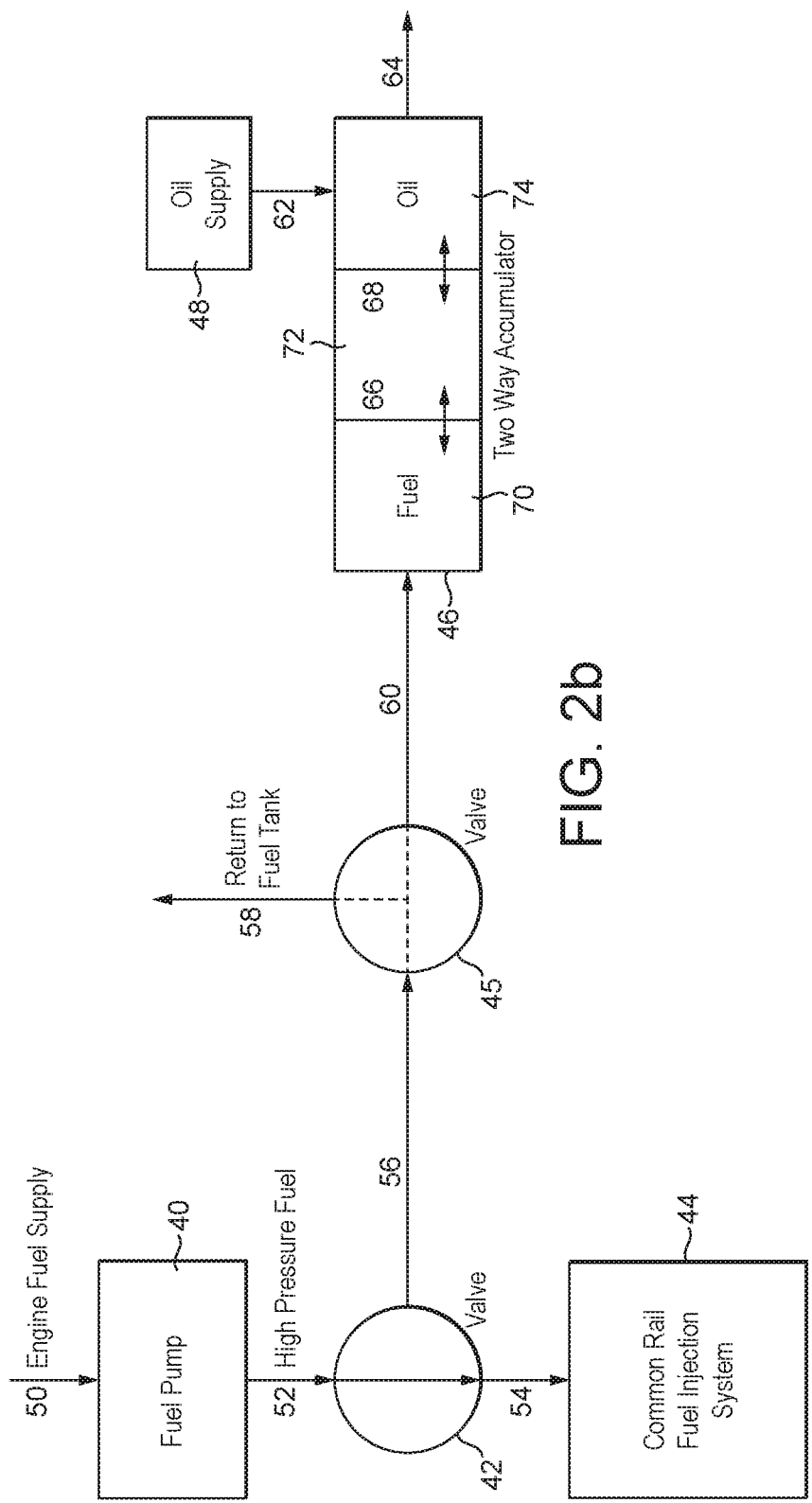

With reference to FIG. 2b, there is now illustrated the operation of the system of FIG. 2a in normal operation, where fuel is being delivered to the common rail fuel injection system. As denoted in FIG. 2b, the valve 42 is configured to deliver the high pressure fuel on line 52 to line 54, and hence to the common rail fuel injection system 44. No connection is made to the line 56, and therefore the valve 45 receives no input. In this mode of operation, fuel is being delivered to the common rail fuel injection 44 as a vehicle is being driven.

Figure 2C:
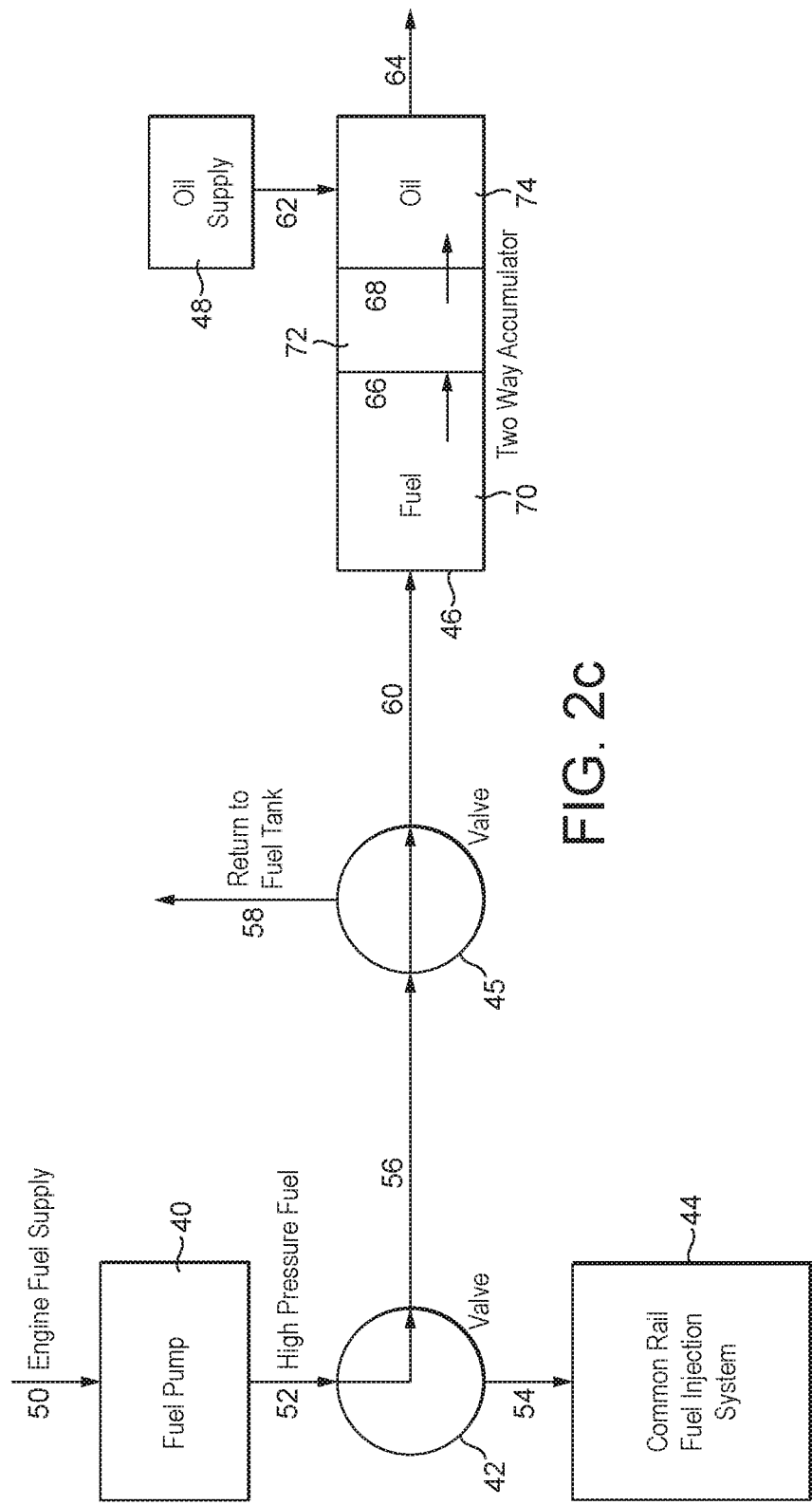

With reference to FIG. 2c, a subsequent operation is illustrated in which the vehicle brakes. During the braking operation, there is no requirement for high pressure fuel on line 52 to be fed to the common rail fuel injection system, and thus the valve 42 is configured such that the high pressure fuel on line 52 is delivered on line 56 to the valve 45.

In accordance with a modification, the valve 45 is configured such that the fuel delivered on line 56 is delivered on line 60 to the two-way accumulator, and is entered into the fuel chamber 70. As the fuel enters into the fuel chamber 70, the size of the fuel chamber increases as denoted by the arrow associated with line 66, with line 66 effectively moving to the right of the figure as the fuel chamber 70 increases. The compression chamber 72 is put under pressure, and the line 68 between the compression chamber and the oil chamber also starts to move to the right, such that the oil stored in the oil chamber 74 is put under higher pressure.

During the braking operation, it may be determined that enough fuel has been delivered to the fuel chamber 70 of the two-way accumulator, in which case the valve 45 is configured such that the fuel on line 56 is delivered to line 58, and returned to the fuel tank. No further fuel is then provided to the two-way accumulator 46.

Figure 2D:
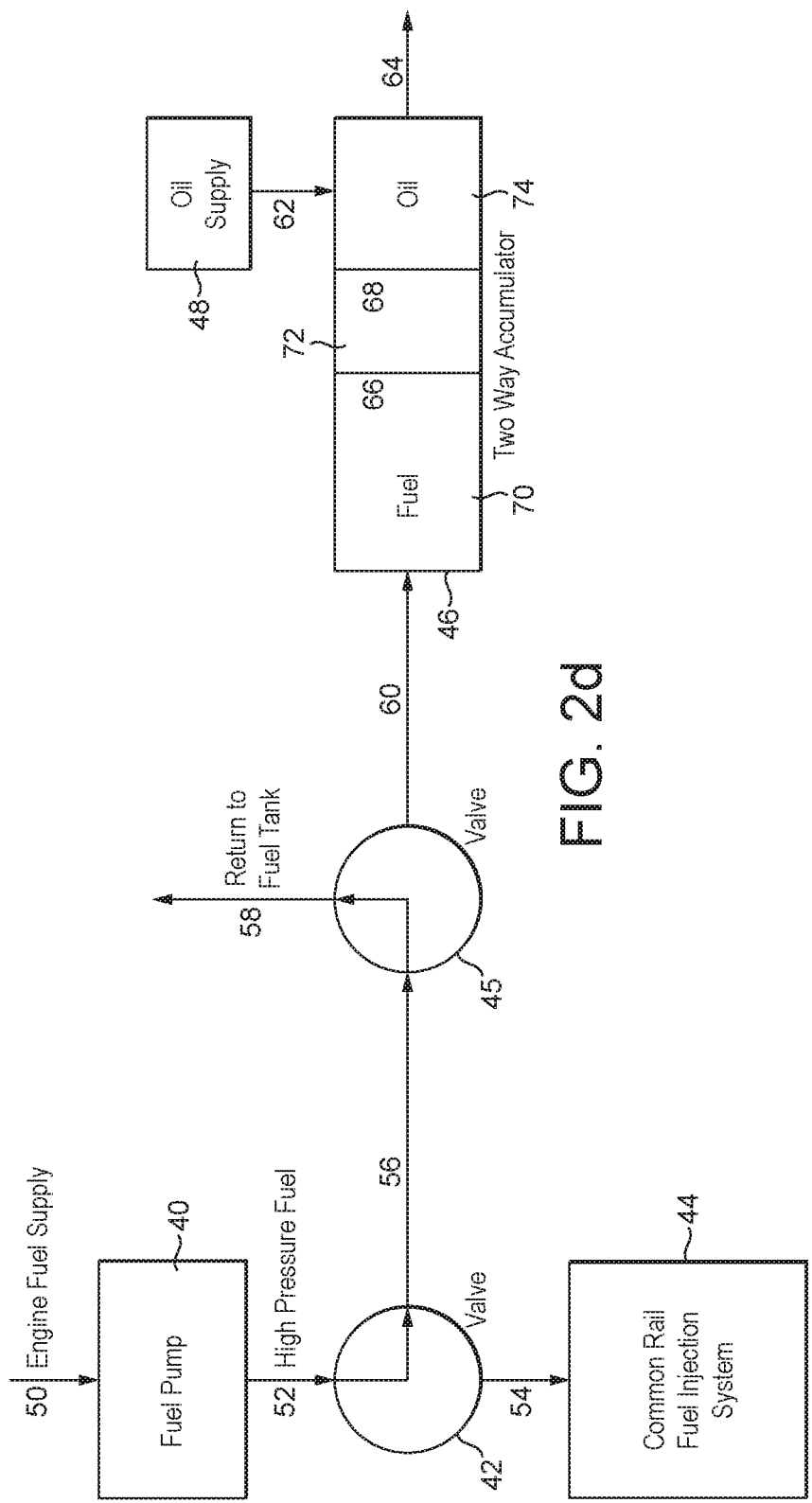

As denoted by FIG. 2d, a point may be reached at which fuel can no longer be pumped into the fuel chamber 70, and the valve 45 is adjusted such that the fuel received on line 56 is delivered on line 58, and returned to the fuel tank.

Figure 2E:
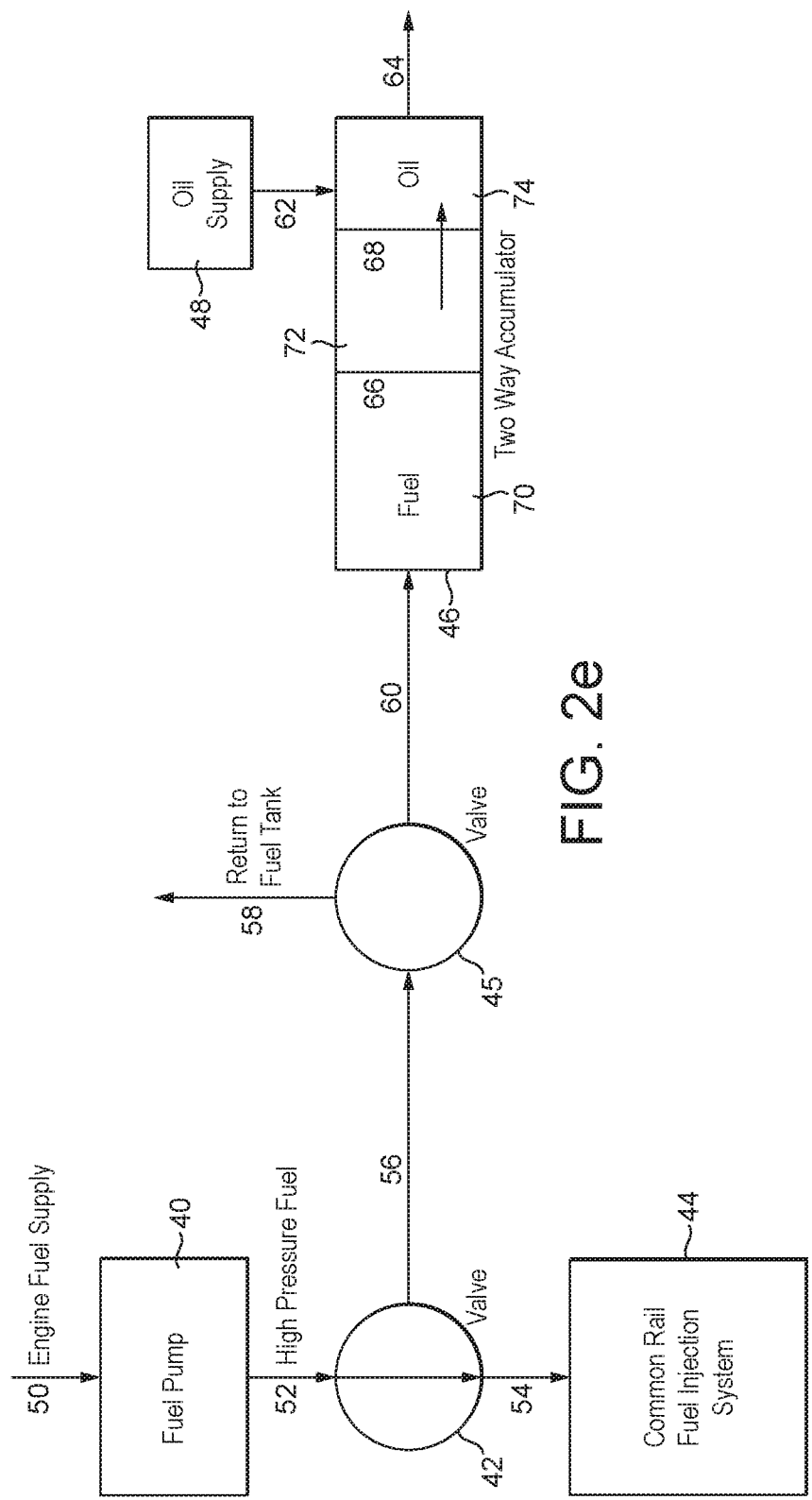

As denoted by FIG. 2e, in a subsequent operation, following the braking operation, the vehicle may accelerate. On acceleration, the valve 42 is again configured such that any high pressure fuel on line 52 is delivered to line 54, for delivery to the common rail fuel injection system 44. The connection of the valve 45 is unimportant, as there is no input on line 56.

In addition, the oil chamber 74 of the two-way accumulator 46 is released, and the oil in the oil chamber 74 which has been stored under high pressure (by filling up of the fuel chamber 70) is released onto line 64. High pressure oil is thus delivered on line 64.

The valves 42 and 45 may be implemented as solenoid assemblies to control the flows as described, and in general each may be considered a flow control mechanism or switch.

The control which switches the status of the valves (or switch) 40, and which allows oil to be released from the accumulator, may utilise control signals from an engine management system, as will be understood by one skilled in the art. For example, the braking can be detected by conventional means, using the accelerator pedal position, engine speed and vehicle speed signals, which are all "normal" means in current vehicles.

For example vehicles are typically fitted with an engine management system which may permit electronic monitoring of any of the accelerator pedal position, the engine throttle position (if throttle is used), the engine speed or the vehicle speed (which may be inferred by ABS braking sensors fitted to each axle or wheel). The engine management system may monitor some or all of these (and other parameters) to detect acceleration and deceleration events. In an automatic gearbox, for example, the same set of signals that are used to control the switching of gears are used.

During braking, the accumulator may become full. This is preferably monitored. The system preferably requires the pressure to be monitored in the accumulator or the accumulator supply line. Once it reaches a target, the system is switched off, for example by de-clutching the pump and/or bypassing. The vehicle then continues to be slowed by conventional braking. The valve 45 can be used, as discussed above, to return fuel to the fuel tank.

In practice this system would not solely be relied upon to provide all of the vehicle braking, but is preferably used in parallel with reduced conventional braking. The described system applies braking through the engine and drive train to the vehicle's road wheels. When this engine braking is disabled, e.g. because the clutch is disengaged, conventional braking still applies. This is the same principle as electric hybrid vehicle operation, in which typically some conventional braking is performed to maintain dynamic vehicle stabilising.

Turning to FIG. 3, when the high pressure oil is delivered on line 64 it is delivered generally to a turbocharger assembly as denoted by reference numeral 80. As illustrated in FIG. 3, the turbocharger assembly preferably includes an oil delivery nozzle 82, an air flow generator 84, and a turbocharger 86.

The high pressure oil on line 64 is delivered to the oil delivery nozzle 82, which delivers the oil in a desired way to the air flow generator 84. The air flow generator may be a Pelton wheel, which is excited by the high pressure oil delivered from the oil delivery nozzle. The Pelton wheel then generates an air flow into the turbocharger 86.

The objective of delivering the oil under pressure is to use the energy of oil flow to generate an air flow in the turbocharger. Thus the turbocharger is "spun-up" more quickly by the high pressure oil flow than it would otherwise be.

Figure 4:
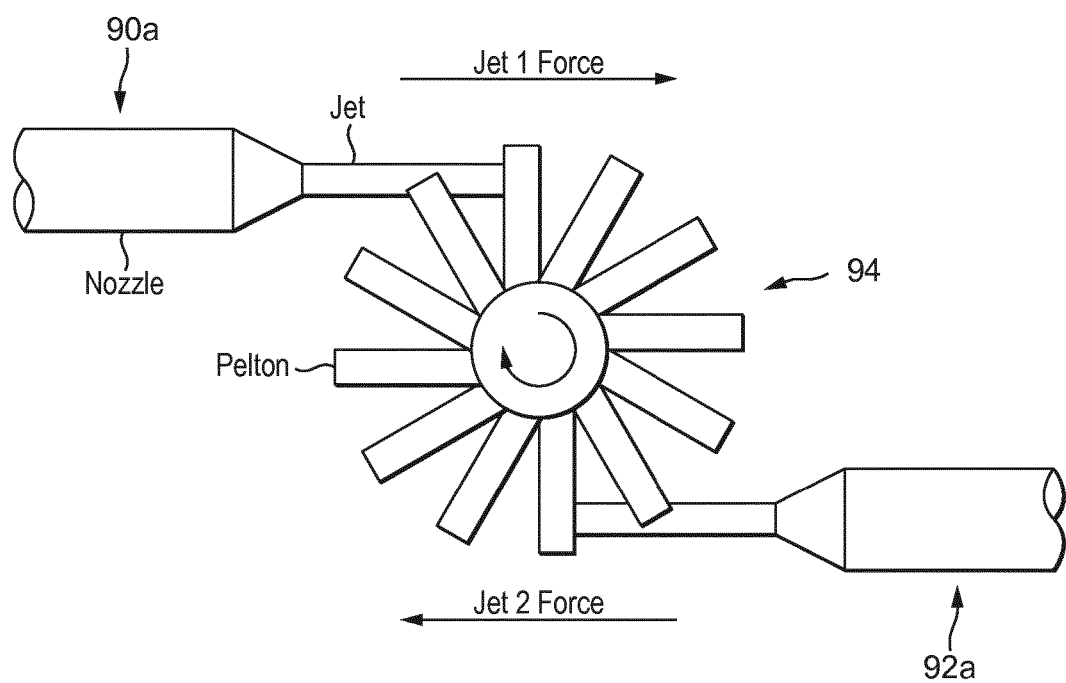
FIG. 4 illustrates an exemplary air flow generator for a turbocharger.

With reference to FIG. 4 there is shown an example implementation of the oil delivery nozzle 82 and air flow generator 84 in a turbocharger. As shown in FIG. 4, a Pelton wheel 94 is provided. Two mechanisms for providing a jet force of oil to the rotors of the Pelton wheel are provided, denoted by reference numerals 90a, 92a. Each receives the oil in a nozzle, to which a jet is connected to deliver the oil to the rotors. The jet of oil cause the Pelton wheel to rotate, which in turn generates an air flow from the rotating rotors.

It is possible to use more or less than two jets. The two jets shown are purely to cancel out a coupling moment that would adversely load and ultimately damage the bearing.

Also the implementation is not restricted to a Pelton, but may be any turbine. In practice the Pelton is well suited to implementations, but other turbine designs could be made to work with higher flow and lower pressure.

Figure 5:
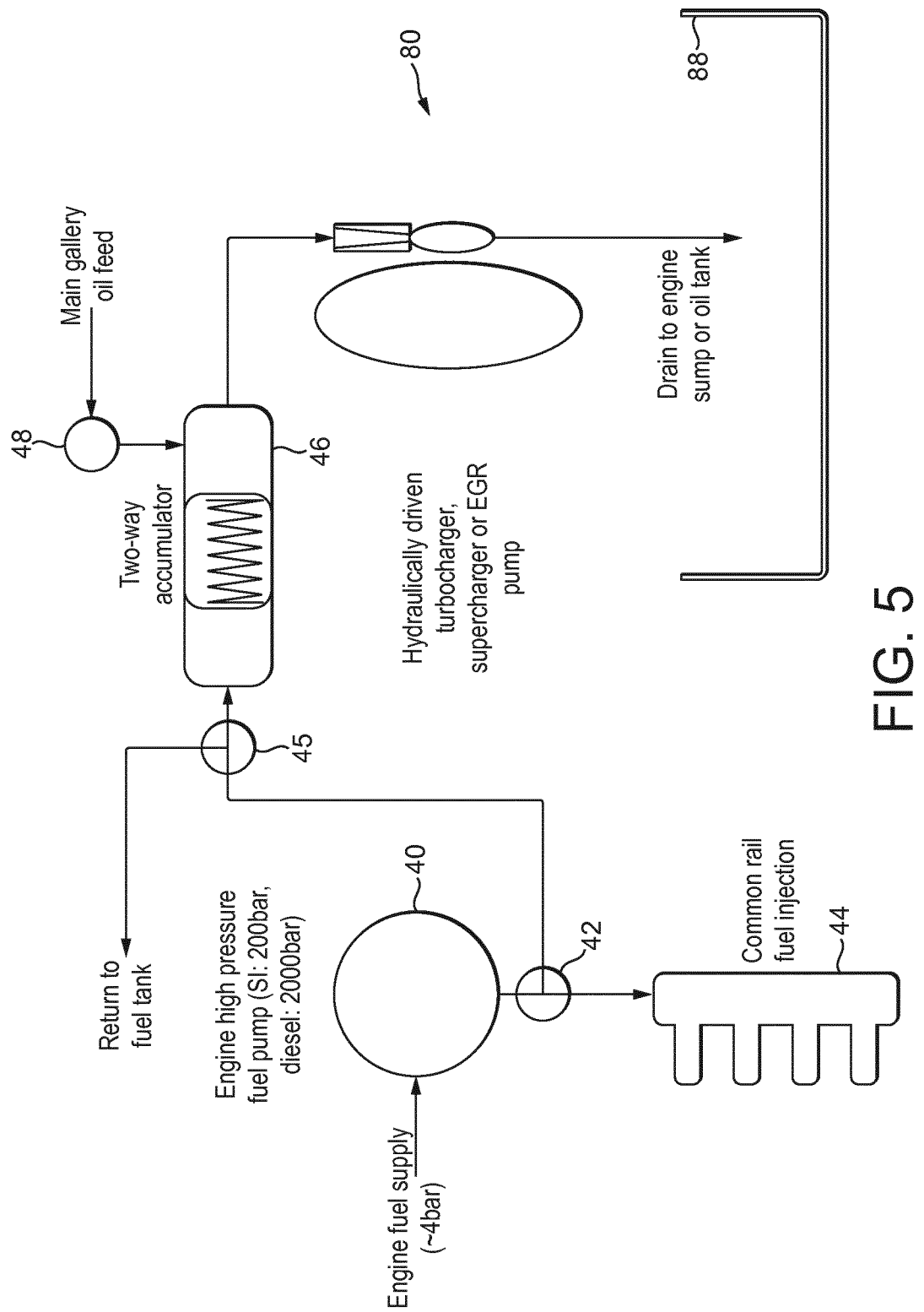
FIG. 5 illustrates an exemplary overview of a system.

As denoted in FIG. 5, there is illustrated an overall operation of the system as described above. In addition to certain elements as shown in FIGS. 2a to 2e, there is also shown a tank 88, in which the oil delivered to the turbocharger assembly may be collected. The tank 88 is a sump or oil tank. The oil captured in the tank may be returned to the oil supply 48.

The system as described may make use of a high pressure pump already existing in the engine, which is typical in the majority of diesel and gasoline engines.

If used in a hydraulic hybrid vehicle fitted with a turbocharged engine, the only modification that may be required is a modified turbocharger assembly, as the system can otherwise tap into the existing hydraulic circuit.

This modification is to convert the high pressure oil flow into an air flow by "spinning up" some rotational element with the high speed oil flow, the rotation generating an air flow.

In accordance with the described system, in recovering braking energy turbocharger lag is overcome, leading to a single turbocharger with lower exhaust back pressures and better fuel economy. Exhaust back pressure refers to gas pressure in the exhaust pipes. Any restriction leads to higher pressure at higher gas flow (higher engine speeds and/or loads). In modern diesels a variable geometry turbocharger effectively restricts the exhaust. At low speed this leads to high air flow and torque. As speed increases the variable geometry mechanism cannot be opened up sufficiently and chokes the engine, leading to the drop off in torque typical of diesels at higher engine speeds. The system described avoids the need for the variable geometry mechanism, meaning a less restricted exhaust, lower pressure in the exhaust and hence less effort required by the engine to push out the burned gasses.

Arrangements are not limited to a turbocharger. A novel way of capturing energy is described, and then that captured energy may be used anywhere in a vehicle as required. This then broadly allows the described technique to use the captured energy anywhere in the vehicle.

The presence of the turbocharger, and the use of the energy specifically for the turbocharger, is an advantageous but not essential implementation. In general the use of the oil energy defines an air flow.

Furthermore, the energy recovery as described may have other uses than as described above. For example, the high pressure fuel pump and accumulator energy recovery element may be used to drive other components, preferably any machine usually driven off the engine, such as pumps, compressors, the alternator etc.

The invention has been described with reference to a particular arrangement. One skilled in the art will appreciate that the invention is not limited to the described arrangement, and the appending claims set out the scope of the invention. In particular insofar as any embodiments or examples are described, various aspects of different embodiments and examples may be selectively chosen and selectively combined.

The invention claimed is:

1. A vehicle engine system, accumulator has comprising:
a fuel pump for selectively delivering fuel under high pressure;
a two-way accumulator having a first chamber for receiving the fuel from the fuel pump, a second chamber for receiving oil from an oil feed, and a compression chamber between the first and second chambers, wherein as one of the first and second chambers is filled up the other of the first and second chambers is compressed;
wherein on vehicle acceleration the fuel pump delivers the fuel to a common rail fuel injection system, and on vehicle braking the fuel pump delivers the fuel to the first chamber of the accumulator to thereby put the oil in the second chamber under pressure, and wherein on subsequent acceleration the second chamber delivers the oil from the second chamber under pressure.

2. The vehicle engine system of claim 1 further comprising a turbocharger, wherein the second chamber delivers oil under pressure to the turbocharger.

3. The vehicle engine system of claim 2 further comprising a rotational element, the rotational element being rotated by the oil delivered from the second chamber output to create an air flow for the turbocharger.

4. The vehicle engine system of claim 3 further comprising a nozzle mechanism for delivering the oil to rotate rotors of the rotational element.

5. The vehicle engine system of claim 3 wherein the rotational element is a Pelton wheel.

6. The vehicle engine system of claim 1 further comprising a valve for selectively routing a fuel supply to one of: the common rail fuel injection system on vehicle acceleration or the accumulator on braking.

7. The vehicle engine system of claim 6 further comprising an additional valve for selectively routing the fuel supply, when routed to the accumulator, to the first chamber of the two-way accumulator or a fuel tank.

8. The vehicle engine system of claim 1 further comprising an oil supply connected to deliver the oil to the second chamber of the two-way accumulator.

9. A method of controlling a vehicle engine, comprising:
delivering fuel from a fuel pump to a fuel chamber connected to an oil chamber during braking, to thereby put the oil chamber under pressure, wherein the fuel chamber and the oil chamber are chambers of a two-way accumulator; and
delivering compressed oil under pressure to a turbocharger during acceleration;
wherein the fuel chamber and the oil chamber of the two-way accumulator are connected by a compression chamber, wherein as the fuel chamber fills up with the fuel the compression chamber puts oil in the oil chamber under pressure.

10. The method of claim 9 wherein the oil is delivered to the turbocharger to create an air flow in the turbocharger.

11. The method of claim 10 wherein the oil is delivered to rotate a Pelton wheel to create the air flow.

12. The method of claim 9 wherein the fuel is delivered to the fuel chamber during a vehicle braking operation.

13. The method of claim 12 wherein the oil is released from the oil chamber after the vehicle braking operation.

14. The method of claim 12 wherein the fuel is delivered when a clutch is engaged.

15. A method of controlling a vehicle engine, comprising:
delivering fuel from a fuel pump to a fuel chamber connected to an oil chamber during vehicle braking, to thereby put the oil chamber under pressure, wherein the fuel chamber and the oil chamber are chambers of a two-way accumulator; and
delivering compressed oil under pressure to a turbocharger during acceleration after a vehicle braking operation and when a clutch is engaged;
wherein the oil is released from the oil chamber after the vehicle braking operation.

16. A vehicle engine system comprising:
a fuel pump for selectively delivering fuel under high pressure;
a two-way accumulator having a first chamber for receiving the fuel from the fuel pump and a second chamber for receiving oil from an oil feed, wherein as one chamber is filled up the other chamber is compressed;
wherein on vehicle acceleration the fuel pump delivers the fuel to a common rail fuel injection system, and on vehicle braking the fuel pump delivers the fuel to the first chamber of the accumulator to thereby put the oil in the second chamber under pressure, and wherein on subsequent acceleration the second chamber delivers the oil from the second chamber under pressure;
a valve for selectively routing a fuel supply to the common rail fuel injection system on the vehicle acceleration, routing the fuel supply to the accumulator on the vehicle braking, and on the subsequent acceleration routing the fuel supply to the common rail fuel injection system, wherein on routing the fuel supply to the common rail fuel injection system on the subsequent acceleration also delivering the oil from the second chamber under pressure.

17. A method of controlling a vehicle engine, comprising:
delivering fuel from a fuel pump to a fuel chamber connected to an oil chamber during braking, to thereby put the oil chamber under pressure, wherein the fuel chamber and the oil chamber are chambers of a two-way accumulator; and delivering compressed oil under pressure to a turbocharger during acceleration;

routing a fuel supply to a common rail fuel injection system on vehicle acceleration;

routing the fuel supply to the accumulator on the braking; and on subsequent acceleration routing the fuel supply to the common rail fuel injection system and delivering the oil from the oil chamber under pressure.

18. A vehicle engine system comprising:

a fuel pump for selectively delivering fuel under high pressure;

a two-way accumulator having a first chamber for receiving fuel from the fuel pump and a second chamber for receiving oil from an oil feed, wherein as one chamber is filled up the other chamber is compressed; and a turbocharger;

wherein on vehicle acceleration the fuel pump delivers the fuel to a common rail fuel injection system, and on vehicle braking the fuel pump delivers the fuel to the first chamber of the accumulator to thereby put the oil in the second chamber under pressure, and wherein on subsequent acceleration after a vehicle braking operation the second chamber delivers the oil from the second chamber when a clutch is engaged; and wherein the second chamber delivers oil under pressure to the turbocharger.

19. The vehicle engine system of claim 18 further comprising:

a rotational element, the rotational element being rotated by the delivered oil output to create an air flow for the turbocharger; and a nozzle mechanism for delivering the oil to rotate rotors of the rotational element.

20. The vehicle engine system of claim 19 wherein the rotational element is a Pelton wheel.

* * * * *